Oct. 17, 1961     J. P. FRANCIS     3,004,301
WEATHER PROTECTOR FOR AUTOMOBILE WINDSHIELD
Filed Dec. 1, 1958
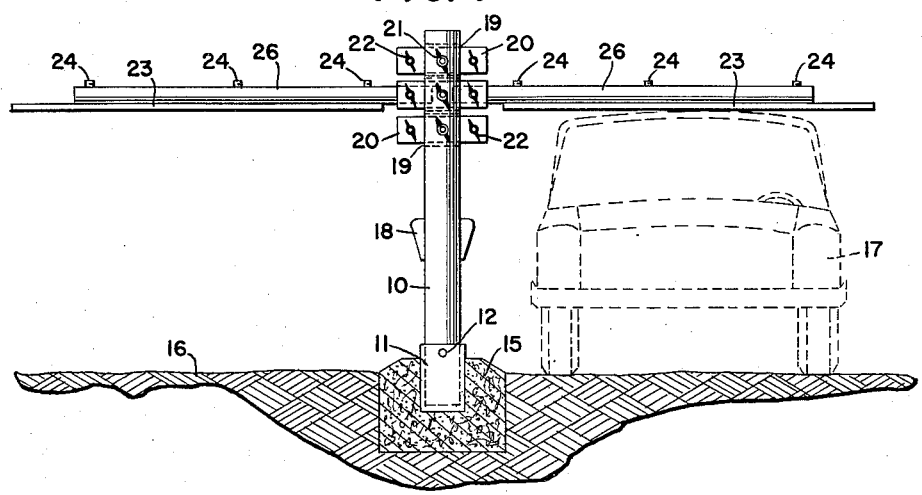
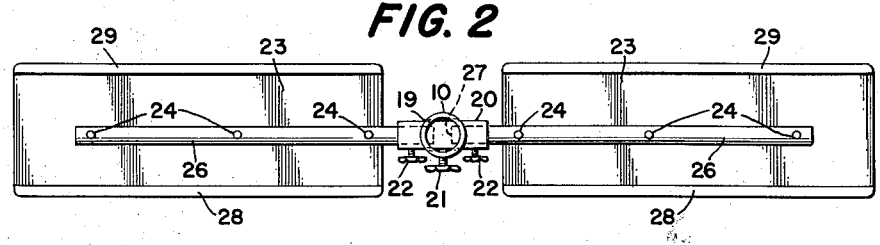
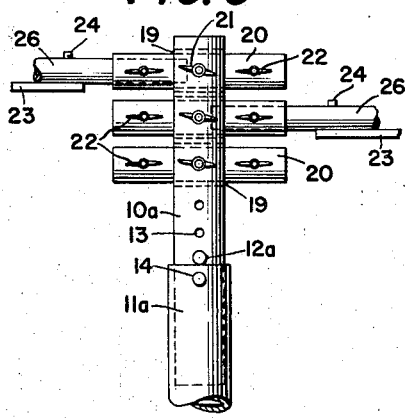
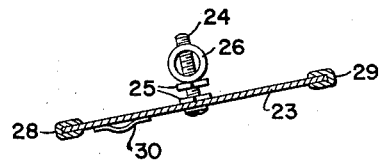
INVENTOR
John P. Francis United States Patent Office 3,004,301
Patented Oct. 17, 1961

3,004,301
WEATHER PROTECTOR FOR AUTOMOBILE
WINDSHIELD
John P. Francis, 20 Boston St., Haverhill, Mass.
Filed Dec. 1, 1958, Ser. No. 777,512
1 Claim. (Cl. 20—1.12)

This invention relates generally to a weather protector for the windshield of an automobile and more particularly to an awning which is supported above and over the roof top and the windshield area of an automobile from a horizontally mounted supporting arm extending outwardly from a central vertically mounted supporting post, and adapted for use in a drive-in parking area such as a drive-in theatre, an object thereof being to provide an extremely simple, sturdy, safe and inexpensive weather protector for the adjustable weather protection of the general windshield area of an automobile in providing clear vision at all times during inclement weather conditions.

Another object of this invention is to provide an awning structure whereby the awning is adjustably movable for angular alignment, and adapted to be adjustable vertically and also horizontally to meet any existing or anticipated condition or interference for the clear and unobstructed vision throughout the general automobile parking area.

A further object of this invention is to provide an adjustable awning structure adapted to provide complete weather protection to the windshield area from any rain, sleet or snow from descending from the forward slope of the roof top or the wrapped-over windshield, and protection from the directional force of the descending weather precipitation in providing weather protection to open type and lowly built automobiles, as well as the more conventional new and older type or make of automobiles.

A still further object of this invention is to provide an awning structure which is very easily, quickly and safely assembled, and adapted to be fully adjusted to suit any condition in a like manner, thereby providing unobstructed and clear vision for the occupants as well as all the other automobile occupants in the general parking area when viewing outdoor movies or the like.

With these objects and still further objects in view, as will hereinafter more fully appear, the invention comprises certain novel constructions, combinations and arrangement of parts, hereinafter described and claimed, and illustrated in the accompanying drawings, in which:

FIGURE 1 is a front elevation view of the device showing the awning in aligned position relative to the automobile. The left hand portion showing the awning structure prior to the entry of an automobile thereunder.

FIGURE 2 is a top plan view of the awning structure showing the opposing awnings as supported by the supporting structure.

FIGURE 3 is a front elevation view, in part, of a modified from of supporting posts; and FIGURE 4 is a cross sectional view of the awning, shown with a modified form of laterally adjustable awning supports.

Referring now in detail to the drawings, a central vertical supporting post 10, FIGURE 1, is shown mounted within an outer cylinder or post 11, which is supported in the concrete anchoring means 15 anchored in the ground 16. A removable locking pin 12 extending through post 11 and post 10 is adapted to secure the said post 10 in the "in use" position. Removal of the locking pin 12 enables the supporting structure to be adjustably rotated in an "out of use" position parallel to the longitudinal alignment of the parked automobile.

A vertical supporting post with horizontal supporting arms extending therefrom, and an awning supported by each arm is shown and described in my copending application, Serial No. 644,050, filed March 5, 1957, now Patent No. 2,869,562. My invention therefore is primarily concerned with the horizontal cylindrical supports for adjustably supporting the opposing horizontal supporting arms with attached awnings at the same level, and also different or separate levels, for vertical and angular adjustment thereof.

In FIGURE 1, the central vertical supporting post 10 is provided with a number of vertically spaced horizontal apertures or cross bores 19 for adjustably supporting the horizontal cylindrical hollow supports 20 therethrough and therefrom. The horizontal supports 20 are provided with opposing thumb screws 22 for adjustably supporting each horizontal supporting arm 26 extending outwardly therefrom. Also shown on the post 10 are the speaker baskets 18.

The awning or panel 23, FIGURE 2, is formed of a substantially rectangular semi-rigid or rigid panel member such as sheet metal, Masonite, fibre board, or other suitable composition and is supported to the horizontal supporting arm 26 by the threaded bolts 24 or other suitable means. The awning 23 is provided with U-shaped flexible rubber beads, one on the forward edge 28 and one on the rear edge 29 to act as rain drip moldings and also as flexible cushions when in contact with the vehicle.

In FIGURE 2, the inner end 27 of each horizontal supporting arm 26 is shown supported within the horizontal support 20. The horizontal support 20 is adjustably supported for axial alignment within the cross bore 19 and is adjustably secured in position by the central thumb screw 21 mounted on the central vertical supporting post 10, and also post 10a of FIGURE 3.

Referring back to FIGURE 1, there is shown an automobile 17 in parked position beneath the awning 23. The awning 23 is adapted to be angularly adjusted upon the axial adjustment of the horizontal supporting arm 26 within the horizontal support 20 on post 10. Individual height adjustment is obtained upon the removal and insertion of supporting arm 26 within the desired horizontal support 20, so that the awning 23 may be supported in spaced relation to the roof top of an automobile, or supported in friction or rain sealing engagement with the roof top, depending upon the height of the roof above the ground level and depending upon the existing or anticipated weather conditions in obtaining clear and unobstructed full vision at all times. The supporting arm 26 and the attached awning 23 are constructed preferably of light material for easier handling in the setup, adjustment and the removal thereof.

In FIGURE 3, there is shown a modified form of a central vertical supporting post 10a provided with vertically spaced horizontal apertures 13 for the vertical and also axial adjustment of said post 10a. The outer supporting cylinder or post 11a is provided with an aperture and a removable locking pin 14 which is inserted through said aperture for securing post 10a in position. A removable supporting pin 12a inserted through an aperture 13 of post 10a is adapted to adjustably support the said post 10a for axial and also vertical adjustment thereof. Also shown are the opposing awnings 23 adjustably supported at different height levels and further adjusted upon the vertical adjustment of post 10a, or horizontal supporting arm 26, or a combination of both adjustments for individual vertical height adjustment to suit and to meet existing or anticipated foul weather conditions and the height of the automobile or automobiles thereunder.

In the cross sectional view of the awning or panel 23, FIGURE 4, there is shown a handle 30 attached to the bottom surface of said awning for manipulating the angular adjustment thereof. A modified form of lateral supporting adjustment of the awning 23 is provided whereby spaced nuts 25, on bolt member 24, enables the said awning 23 to be adjustably contoured laterally upon the spaced vertical adjustment of nuts 25 and bolt member 24. The spaced nuts 25 therefore provides lateral adjustment of the lateral contour of the awning 23 to suit the lateral portion of the roof top of an automobile.

The vertical adjustment of the horizontal supporting arms 26 are preferably pre-aligned, based upon the contour of the terrain in the parking area, the viewing clearance of the movie screen and the general direction of the weather precipitation. Further vertical adjustments are made due to the automobile thereunder, or the changes and severity in weather conditions or any viewing interference in the parking area of the drive-in theatre. Angular adjustment of the awnings 23 are also preferably pre-aligned upon the adjustment of thumb screw 21 engaging the horizontal support 20, whereby further individual angular adjustment of the awnings 23 are performed upon the adjustment of thumb screws 22, each screw 22 engaging each horizontal supporting arm 26 in the horizontal support 20.

The simplicity in the structure of the device; the simplicity and the ease in the erection, structural changes, and the operation thereof; and combined with the extreme comfort, viewing pleasure, safety and the savings; all this enjoyed and benefited by both the management and the patrons.

Therefore clear and total windshield vision is provided without any on and off or continuous automobile engine noise, or windshield wiper blur or streaks, or windshield wiper or engine noise caused by the automobile or adjacent parked automobiles.

Having thus described my invention, I desire to add that changes may be made in one embodiment alone or combined in one embodiment with the other.

Changes, therefore, in the construction and the arrangement, may be made without departing from the spirit and the scope of the invention as disclosed in the appended claim.

I claim:

An automobile windshield weather protector adapted for erection and use in a drive-in parking area such as a drive-in theatre comprising, a central vertical supporting post, said supporting post being provided with vertically spaced cross bores, axially adjustable vertically spaced horizontal hollow supports extending through and outwardly from said vertically spaced cross bores, a pair of independently adjustable horizontally mounted supporting arms, each arm extending outwardly from only one side of the opposite side walls of said central vertical supporting post within and outwardly of the opposite ends of said axially adjustable horizontal hollow supports, each of said horizontal supporting arms of said pair being adjustably supported freely of each other for axial and vertical height adjustment at the same or at separate levels of support, an awning adjustably supported from said horizontal supporting arm, and laterally spaced apart threaded bolt means adjustably supporting said awning to said supporting arm for vertically and laterally adjustable alignment therefrom, said awning adapted to adjustably engage the lateral contour of the roof top of an automobile in lateral rain sealing engagement or in spaced apart relationship relative thereto upon the adjustable alignment of said adjustable supporting arm and the said adjustable awning.

References Cited in the file of this patent
UNITED STATES PATENTS

| | | |
|---|---|---|
| 882,870 | Cary | Mar. 24, 1908 |
| 1,471,909 | Miller | Oct. 23, 1923 |
| 1,741,424 | Lundstrom | Dec. 31, 1929 |
| 1,744,321 | Markman | Jan. 21, 1930 |
| 2,023,155 | Turner | Dec. 3, 1935 |
| 2,398,441 | Moore | Apr. 16, 1946 |
| 2,508,757 | Gray | May 23, 1950 |
| 2,757,678 | Stahl | Aug. 7, 1956 |
| 2,769,451 | Edgin | Nov. 6, 1956 |
| 2,869,562 | Francis | Jan. 20, 1959 |
| 2,926,678 | Francis | Mar. 1, 1960 |

FOREIGN PATENTS

| | | |
|---|---|---|
| 684,792 | Great Britain | Dec. 24, 1952 |